US011108338B2

(12) United States Patent
Geske et al.

(10) Patent No.: US 11,108,338 B2
(45) Date of Patent: Aug. 31, 2021

(54) DUAL SUBMODULE FOR A MODULAR MULTILEVEL CONVERTER AND MODULAR MULTILEVEL CONVERTER INCLUDING THE SAME

(71) Applicant: GE Energy Power Conversion Technology Ltd, Rugby (GB)

(72) Inventors: Martin Geske, Berlin (DE); Joerg Janning, Berlin (DE)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days.

(21) Appl. No.: 16/078,864

(22) PCT Filed: Feb. 24, 2017

(86) PCT No.: PCT/EP2017/054385
§ 371 (c)(1),
(2) Date: Aug. 22, 2018

(87) PCT Pub. No.: WO2017/144693
PCT Pub. Date: Aug. 31, 2017

(65) Prior Publication Data
US 2019/0052187 A1 Feb. 14, 2019

(30) Foreign Application Priority Data
Feb. 25, 2016 (EP) .................................... 16157275

(51) Int. Cl.
*H02M 7/483* (2007.01)
*H02M 1/32* (2007.01)
*H02M 1/00* (2006.01)

(52) U.S. Cl.
CPC .............. *H02M 7/483* (2013.01); *H02M 1/32* (2013.01); *H02M 2001/0054* (2013.01); *H02M 2007/4835* (2013.01)

(58) Field of Classification Search
CPC ........... H02M 2007/4835; H02M 1/32; H02M 1/325; H02M 1/483; H02M 2001/0054; H02M 7/483
See application file for complete search history.

(56) References Cited

U.S. PATENT DOCUMENTS

| 5,467,049 A * | 11/1995 | Kida .................... H03K 17/105 327/438 |
| 2012/0038330 A1* | 2/2012 | Buiatti ................ H02M 3/1582 323/234 |

(Continued)

FOREIGN PATENT DOCUMENTS

| DE | 10103031 A1 | 7/2002 | |
| EP | 2432109 A2 | 3/2012 | |
| WO | WO-2014005634 A1 * | 1/2014 | ............ H02M 7/483 |

OTHER PUBLICATIONS

European Search Report and Written Opinion dated Aug. 16, 2016 which was issued in connection with EP 16157275.5 which was filed on Feb. 25, 2016.

(Continued)

Primary Examiner — Harry R Behm
(74) Attorney, Agent, or Firm — Wood IP LLC (57) ABSTRACT

A dual submodule is created for a modular multilevel converter, whereby the dual submodule has two interconnected submodules, whereby each submodule has an asymmetrical half-bridge circuit with two parallel bridge branches, which are connected between a first and a second terminal connection of the submodule, whereby each bridge branch is formed from a series circuit of a power semiconductor switch, and a diode, whereby the power semiconduc- (Continued)

tor switch is allocated to an antiparallel free-wheeling diode, and has a capacitor, which is connected in parallel with the asymmetrical half-bridge circuit between the first and the second terminal connections of the module. The submodules are connected to each other via their AC terminals to form the dual submodule. Further, a modular multilevel converter is created, comprising a number of such dual submodules in each of its converter branches.

14 Claims, 5 Drawing Sheets

(56) References Cited

U.S. PATENT DOCUMENTS

| | | | |
|---|---|---|---|
| 2013/0235624 A1* | 9/2013 | Janning | H02M 5/4585 363/37 |
| 2015/0009594 A1* | 1/2015 | Okaeme | H02H 7/268 361/42 |
| 2015/0049530 A1* | 2/2015 | Trainer | H02M 7/797 363/123 |
| 2016/0126827 A1* | 5/2016 | Dong | H02M 1/32 363/50 |
| 2018/0076734 A1* | 3/2018 | Jimichi | H02M 1/32 |

OTHER PUBLICATIONS

International Search Report and Written Opinion dated May 22, 2017 which was issued in connection with PCT/EP2017/054385 which was filed on Feb. 24, 2017.
Nami: "Analysis of Modular Multilevel Converters with DC Short Circuit Fault Blocking Capability in Bipolar HVDC Transmission Systems", ABB Corporate Research, Oct. 29, 2015, pp. 1-10.
Ilves: "A Submodule Implementation of Parallel Connection of Capacitors in Modular Multilevel Converters", KTH—Royal Institute of Technology Sweden, Oct. 17, 2013, pp. 1-10.

* cited by examiner

| Schaltzustand | $I_a$ | T1 | T4 | T6 | T7 | $U_a$ | $W_{C1}$ | $W_{C2}$ |
|---|---|---|---|---|---|---|---|---|
| 1 | pos. | 0 | 0 | 0 | 0 | 0 | 0 | 0 |
|   | neg. | 0 | 0 | 0 | 0 | $U_{C1}+U_{C2}$ | +1 | +1 |
| 2 | pos. | 1 | 0 | 0 | 0 | $U_{C1}$ | -1 | 0 |
|   | neg. | 1 | 0 | 0 | 0 | $U_{C1}+U_{C2}$ | +1 | +1 |
| 3 | pos. | 0 | 1 | 0 | 0 | 0 | 0 | 0 |
|   | neg. | 0 | 1 | 0 | 0 | $U_{C2}$ | 0 | +1 |
| 4 | pos. | 0 | 0 | 1 | 0 | $U_{C2}$ | 0 | -1 |
|   | neg. | 0 | 0 | 1 | 0 | $U_{C1}+U_{C2}$ | +1 | +1 |
| 5 | pos. | 0 | 0 | 0 | 1 | 0 | 0 | 0 |
|   | neg. | 0 | 0 | 0 | 1 | $U_{C1}$ | +1 | 0 |
| 6 | pos. | 1 | 0 | 1 | 0 | $U_{C1}+U_{C2}$ | -1 | -1 |
|   | neg. | 1 | 0 | 1 | 0 | $U_{C1}+U_{C2}$ | +1 | +1 |
| 7 | pos. | 0 | 1 | 0 | 1 | 0 | 0 | 0 |
|   | neg. | 0 | 1 | 0 | 1 | 0 | 0 | 0 |

DUAL SUBMODULE FOR A MODULAR MULTILEVEL CONVERTER AND MODULAR MULTILEVEL CONVERTER INCLUDING THE SAME

This invention relates to a dual submodule for a modular multilevel converter and a modular multilevel converter with a series connection of such dual submodules.

BACKGROUND OF THE INVENTION

Converters for converting direct current to alternating current and vice versa are used for many applications, e.g. for coupling electrical networks with variable speed drives for energy exchange between two electrical networks, etc. For this purpose, converters are known in various circuit topologies and configurations. For smaller and medium-sized powers, conventional two-phase converters are known which offer simple and robust solutions and are widely used.

With the continuous development of power semiconductor switches and the application possibilities of power electronics, ever newer converter topologies for ever higher power and voltage ranges are being sought and developed. In the medium and high-voltage range, the so-called multilevel converters are frequently used to generate a number of voltage stages and increase the voltages to higher levels up to ranges of high-voltage direct-current (HVDC) transmission, in which case a sufficient voltage quality can be achieved with a high number of stages.

Modular Multilevel Converters (MMC and M2C) represent an increasingly popular converter topology. This converter has phase branches or modules consisting of two series-connected converter branches, where each converter branch is built up from a number of similar cells (submodules). Each submodule is built up from a bridge circuit with controllable power semiconductor switches and an internal capacitor for temporary storage of electrical energy. The bridge circuit can be a half-bridge with two controllable series-connected power semiconductor switches, or else an H or full bridge, which has two parallel bridge branches, in each of which two power semiconductor switches are arranged in series with one another. A free-wheeling diode is connected antiparallel to each controllable switch. Due to the modular design, the converter is individually scalable for different powers and applications. The voltages and currents on the alternating current (AC) and direct current (DC) side can be controlled and adjusted in a highly dynamic way and largely decoupled from one another.

Such a modular multilevel converter is described, for example, in DE 101 03 031 A1, where the submodules are designed in the manner of a half-bridge. Each submodule thus has only two series-connected power semiconductor switches, which are connected to a capacitor as an energy storage for the respective submodule in such a way that unipolar voltage, either the positive capacitor voltage or zero voltage, falls across the two connection terminals of the submodule. This circuit is relatively inexpensive and is characterized by low line losses.

Modular multilevel converters with submodules in the form of full or half-bridges are also known. The use of full or half-bridges allows an inversion of the voltage drop across the capacitor at the submodule terminals. However, this is achieved with a higher number of power semiconductor switches and thus the increased circuit complexity and increased costs of the converter as a whole. In addition, in the case of such full bridge-based submodules, two switches are always current-conductive, as a result of which the line losses are increased significantly compared to half-bridge-based submodules. For applications in the medium and high-voltage range, such line losses can be unacceptable.

An important aspect is also the robustness of the converter in the case of a short-circuit in the DC voltage intermediate circuit. If a short-circuit occurs in the DC voltage intermediate circuit, which is fed by an alternating voltage network, very high short-circuit currents can flow through the converter branches. When half-bridges are used as submodules, these short-circuit currents flow through the free-wheeling diodes which are connected antiparallel to the respective power semiconductor switches. Consequently, the free-wheeling diodes must be relatively heavily dimensioned in order to withstand such transient short-circuit currents before they are detected and the converter is disconnected from the DC voltage intermediate circuit by opening the power switch on the alternating-current side or by disconnecting a DC switch. To this extent, relatively high limit load-integral requirements must also be imposed on the diodes used. The limit load integral, also referred to as the i2t value, is a criterion for the short-term overloading capacity of a semiconductor component, e.g. a diode. It indicates the permissible maximum value that may be applied within a certain time period without exceeding the permissible junction temperature, thus destroying the component. The limit load integral is determined by integrating the square value of the current over time for a specific time period. The limit load integral of the diodes used must be above the corresponding limit load integral of a fuse used to shut down the converter in the case of a short-circuit.

It is known to provide special short-circuit protection devices for the diodes or free-wheeling diodes in the submodules of modular multilevel converters. For example, WO 2008/110129 A1 provides thyristors arranged parallel to the free-wheeling diodes of the half-bridges in the submodules and are ignited in the case of a short-circuit in order to transfer a part of the short-circuit current flowing through the respective free-running diode. However, this increases the complexity and costs of the submodule circuit and its operation.

In view of the different possible applications and requirements, newer configurations of submodules are constantly being developed for modular multilevel converters with the aim of reducing the number of cells, the number of power semiconductor switches and the line losses and increasing the robustness of the converter in the case of a short-circuit.

An overview of modular multilevel converters with different submodule configurations, including full-bridge, crossed configurations, mixed cells, asymmetric cells, etc., can be found e.g. in Alireza Nami, et al.: "Modular Multilevel Converters for HVDC Applications: Review on Converter Cells and Functionalities", in IEEE Transactions on Power Electronics, Vol. 30, No. 1, January 2015, pages 18-36. The use of full bridges results in a relatively high number of power semiconductor switches and increased line losses in operation.

Kalle Ilves, et al.: "A Submodule Implementation for Parallel Connection of Capacitors in Modular Multilevel Converters", in Power Electronics and Applications (EPE), 2013 15th European Conference on, pages 1-10, describes a dual submodule with two parallel-connected full bridges. Two full-bridge circuits are connected to one another via their respective alternating voltage connections, while a first DC voltage connection of a first full-bridge and a second DC voltage connection of the second full bridge build up the two DC voltage terminals of the dual submodule. The dual submodule may be used for direct AC-AC conversion. However, it has twice as many power semiconductor switches as two series-connected half-bridge-based submodules. In the case of dual submodules, which cause a parallel connection of the two intermediate circuit capacitors due to certain switching states, different voltages of the capacitors can lead to partial large compensation currents and correspondingly higher losses within the submodules.

There is also a need for new submodule configurations for modular multilevel converters that provide the half-bridge-based submodules, including a low number of power semiconductor switches and low line losses, while simultaneously providing high short-circuit strength. In addition, to be able to use a mechanical basic construction for a number of submodule versions. To date, half-bridge-based submodules require a different mechanical basic structure than full bridge-based submodules.

SUMMARY

The invention therefore aims to provide a submodule for use in a modular multilevel converter with a similar voltage and current characteristics as half-bridge-based submodules, and that is relatively inexpensive and uncomplicated, and in particular requiring a small number of power semiconductor switches, and having low line losses in operation. In an embodiment, the submodule can be used with a mechanical basic structure consisting of other existing submodule types.

According to an aspect of the invention, a dual submodule is provided for a modular multilevel converter, where the dual submodule has two interconnected submodules. Each submodule has an asymmetric H-bridge circuit with two parallel bridge branches connected between a first and a second terminal connection of the submodule, and a capacitor. Each bridge branch is formed from a series circuit comprising a power semiconductor switch and a diode, where an antiparallel-connected free-wheeling diode is associated with the power semiconductor switch. The capacitor is connected in parallel to the asymmetrical half-bridge circuit between the first and the second terminal connections of the submodule. A connection point between a power semiconductor switch and a diode of each bridge branch of one of the submodules is connected directly to a respective connection point between a power semiconductor switch and a diode of a bridge branch of the other submodule to form the dual submodule.

Thus, according to the invention, two asymmetric half-bridge circuits are connected in parallel to each other via their alternating current (AC) terminals to form the dual submodule. The dual submodule has the same number of power semiconductor switches as two series-connected half-bridge submodules, which can functionally replace the dual submodule. The dual submodule also has a voltage and current characteristic corresponding to that of half-bridge submodules. It can generate a unipolar output voltage and conduct a bipolar current. In operation, it can be ensured that a maximum of one power semiconductor switch per bridge of the dual submodule is contained in the line path, so that the line losses also correspond at most to those of submodules based on a half-bridge. It can also be achieved, in some switching states of the power semiconductor switches, that two semiconductors per submodule in the current path conduct the current in parallel, so that, in these switching states, a reduction in the line losses compared to submodules based on half-bridges, in which the entire current flows through a single free-wheeling diode, can be effected. These switching states in the dual submodule also improve the short-circuit strength of a converter, because the limit load integral of the free-wheeling diodes can be shared in the parallel current paths. Compared to a dual submodule based on a full bridge, the number of power semiconductor switches in the circuit and the line losses are reduced by a factor of 2 at the least. The dual submodule has a simple and cost-effective design. Its configuration also provides a basis for the fact that existing mechanical basic structures, which are used, for example, for submodules based on full bridges or asymmetrical full bridges, can also be used without major modifications to the dual submodule.

In embodiments, a first, for example, more negative, terminal of one of the submodules can form a first input/output terminal of the dual submodule, while a second, for example, more positive terminal of the other submodule can form a second input/output terminal of the dual submodule.

The bridge circuit capacitors can be unipolar ones. On energizing the power semiconductor switches, voltage can be generated or applied between the first and second input/output terminals, which is either a zero voltage, a voltage corresponding to the positive voltage of a capacitor, or a voltage corresponding to the sum of the positive voltages of the capacitors.

As already mentioned, the dual submodule can be configured in such a way, in the case of the transmission of a current between the first and second input/output terminals of the dual submodule, only a single power semiconductor has a current flow in any desired direction in each submodule.

In an embodiment, the dual submodule is further adapted to transmit a current between the first and the second input/output terminals of the dual submodule through two parallel current paths in certain switching states, in particular when all the power semiconductor switches are switched off, whereby each current path comprises two of the diodes or free-running diodes, i.e. one diode or free-floating diode in the first asymmetric half-bridge circuit and another one in the second asymmetric half-bridge circuit. This switching state of the dual submodule can also be used in the case of a short-circuit in the DC voltage intermediate circuit, whereby the current load is then split between the two parallel current paths and the associated diodes. The instantaneous transient short-circuit current strength per diode is reduced, and the limit load integral (i2t) requirements for each diode or free-running diode can be reduced.

In an embodiment, all diodes and free-wheeling diodes of each submodule are aligned in the forward direction from the second to the first terminal connection of each submodule. In other words, all diodes and free-wheeling diodes are aligned in the forward direction from the first to the second input/output terminal of the dual submodule.

In addition, the asymmetric half-bridge branches are designed in such a way that the diodes in the bridge branches of each submodule are connected directly to different terminals of the submodule. In other words, the diodes are arranged diagonally in each asymmetric half-bridge circuit in such a way that the cathode of one diode is connected to the positive pole of the submodule while the anode of the other diode is connected to the negative pole of the submodule.

In addition, in the an embodiment, the submodules are connected to each other electrically in such a way that an anode of a diode in a bridge branch of one of the submodules is always connected directly to a cathode of a diode in a bridge branch of the other submodule. In other words, in the case that the controllable power semiconductor switches of the dual submodule are formed from IGBTs, a collector of a power semiconductor switch in a bridge branch of one of the submodules is connected directly to an emitter of a power semiconductor switch in a bridge branch of the other submodule.

It is understandable that other types of controllable power semiconductor switches, e.g. IGCTs, MOSFETs, GTOs, etc., can also be used.

According to another aspect of the invention, a modular multilevel converter is provided for converting an alternating voltage into a direct voltage or vice versa. The modular multilevel converter has at least one phase inverter, which has an alternating voltage terminal, and at least one DC voltage connection connected to a DC voltage intermediate circuit, whereby a converter branch is formed between each DC voltage terminal and each alternating voltage terminal, and whereby each of the converter branches has at least one dual submodule, according to the invention, based on any of the embodiments described in the preceding claims. The dual submodule, in particular, its simple and cost-effective design, the possibility of using existing mechanical basic structures of submodules based on full-bridge or asymmetrical full-bridge also for the dual submodule, the low number of power semiconductor switches in the circuit, the low number of series-connected, current-carrying power semiconductor switches in the conduction path in operation and the associated low line losses, the possibility of conducting the current and, in particular, a short-circuit current through two parallel current paths with respective diodes or free-wheeling diodes, thus increasing the robustness of the dual submodule in relation to its short-circuit strength or reducing the i2t requirements for the diodes and free-wheeling diodes, are further advantages of the modular multilevel converter.

The modular multilevel converter can have any number of phase branches corresponding to the desired number of phases. In general, three phases are provided. Depending on the application, a single phase branch can be sufficient, or two or more than three phases can be required. The modular multilevel converter has a first DC voltage terminal, which can be connected to a first, e.g. positive, terminal of the DC voltage intermediate circuit, and a second DC voltage terminal, which can be connected to a second, e.g. negative or more negative, terminal of the DC voltage intermediate circuit. In an embodiment, the same number of dual submodules, in each case two or more series-connected dual submodules, are arranged in each converter branch of the converter. In principle, however, the converter branches can differ in terms of the number of dual submodules.

A control device for controlling the operation of the modular multilevel converter can be provided, which is adapted to drive the power semiconductor switches according to a predetermined pattern in such a way that a single-phase or multi-phase alternating voltage is converted at an alternating voltage terminal of the current converter into a DC voltage at the DC voltage intermediate circuit or vice versa. In particular, the control device can control the power semiconductor switches in such a way that a unipolar terminal voltage always drops across the dual submodules and a bipolar current can be transmitted through each converter branch. The modular multilevel converter is thus suitable for many different applications, e.g. high-voltage direct current (HVDC) transmission, large power drives, e.g. pumped storage power plants, medium-voltage drives, converter systems for railway power supply, and medium-voltage DC power transmission (MDT), e.g. photovoltaic and wind power plants, etc. According to invention, the dual submodules can replace the half-bridge-based submodules conventionally used in modular multilevel converters with further reduced line losses, improved short-circuit strength and reduced i2t requirements for the semiconductor components. The modular mechanical basic structure, which is used, for example, for full bridge-based submodules, can, in principle, also be used relatively easily for the dual submodule.

In an embodiment, the control device can be arranged to detect a short-circuit in the DC voltage intermediate circuit and then switch off all of the power semiconductor switches of all of the dual submodules in the short-circuit path in order to conduct a short-circuit current via parallel current paths in each dual submodule, whereby each current path has two series-connected diodes of the dual submodule. The load on the diodes with the short-circuit current is reduced by a factor of 2, and the i2t design of the diodes can be reduced accordingly, ideally by up to one quarter. Short-circuit protection devices for the diodes or free-wheeling diodes are not required because of the topology as described in the invention.

BRIEF DESCRIPTION OF THE DRAWINGS

Further details of embodiments of the invention result from the dependent claims, the drawing and the associated description. The invention is described in greater detail below with reference to a drawing, which shows exemplary, non-limitative embodiments of the invention, whereby identical reference numerals are used in all figures to designate identical components.

DETAILED DESCRIPTION

Reference will now be made to the embodiments of the invention, which are illustrated in the drawings. It should be understood that the embodiments illustrated in the drawings are merely exemplary and do not limit the invention as such. Rather, the embodiments are merely intended to explain possible embodiments and enable the person skilled in the art to execute the invention. It must also be understood that, in an effort to provide a concise description of possible embodiments, not all of the details covered by the scope of the invention can be given.

Figure 1:
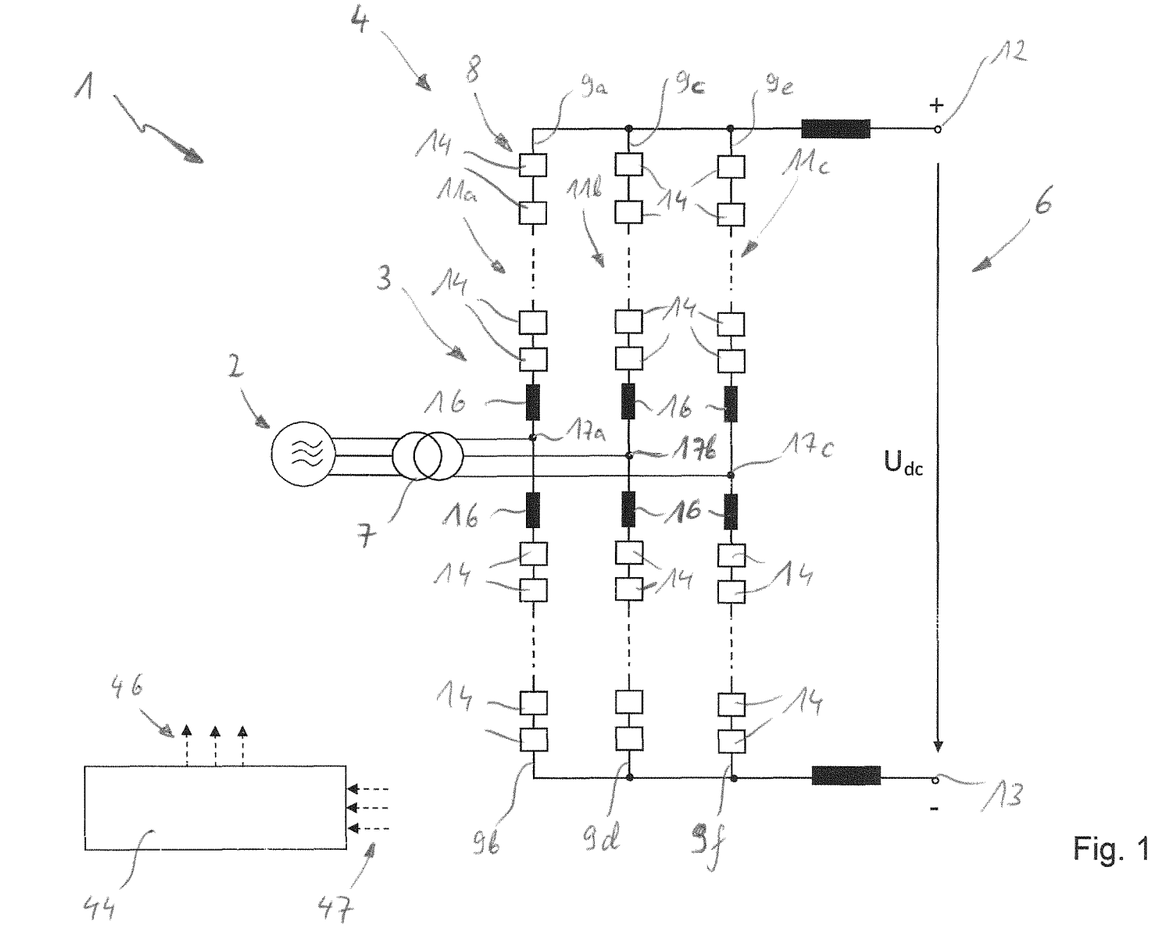
FIG. 1 shows an exemplary system with a modular multilevel converter for coupling an electrical power supply network, an electrical machine or another alternating voltage source with another network or a load to illustrate an exemplary application of the invention, in the form of a simplified block diagram.

FIG. 1 shows a highly simplified illustration of system 1 that can represent e.g. a high-voltage or medium-voltage DC distribution system for electrical energy transmission at high or medium DC voltages. Such a system could be used, for example, for coupling DC voltage applications to alternating current networks, e.g. photovoltaic or busbar systems with DC voltage or DC voltage networks. In addition, such a system can also be designed as a so-called back-to-back system, in which the DC voltage side 6 can be connected directly to an electrical converter, similar to inverter 4. Such an arrangement can be used for a coupling of applications or electrical networks with alternating voltage with an alternating voltage network, e.g. for pumped storage power plants using generators, wind power plants or for driving electrical machines, e.g. pumps and compressors, and for coupling electrical alternating voltage networks. For the transmission of electrical energy, the converters on the DC voltage side 6 can also be connected indirectly via a DC voltage transmission device. System 1 comprises a three-phase alternating current source 2, that can be, for example, an electrical power supply network, an electrical alternating current (AC) machine, an AC generator, a wind power installation, etc. Electrical inverter 4 is connected to alternating voltage source 2 with its alternating voltage side 3, the DC voltage side 6 of which can be connected to a different electrical power supply network or electrical converter, similar to inverter 4, by means of a direct current transmission device not shown here. The connection of inverter 4 to alternating voltage source 2 can optionally take place via transformer 7. In addition, it is likewise conceivable that two or more DC voltage networks with different voltages can be coupled by converters, similar to inverter 6, via transformer 7 which is operated in the medium frequency range. This embodiment allows for a galvanically separate coupling of DC voltage networks, whereby transformer 7, by operation in the medium frequency range, can be designed such that it has a considerably smaller structural volume or a considerably reduced size. Inverter 4 has at least one first converter 8, that can be operated here as a rectifier in order to convert alternating voltage $U_{ac}$ of alternating voltage source 2 into the output-side DC voltage $U_{dc}$. Optionally, inverter 4 could have another converter, not shown here, which converts the voltage $U_{dc}$ into a suitable alternating voltage. Converter 8 could be used in reverse as an inverter in order to convert the direct voltage $U_{dc}$ into an alternating voltage for feeding into the alternating voltage network 2. It is understood that the function of the converter(s) is reversed when the energy flow to the power supply network or the voltage sink 2 occurs.

As shown in FIG. 1, the converter comprises six converter branches 9a-9f, of which two, one upper and one lower 9a, 9b and 9c, 9d and 9e, 9f respectively form a respective phase branch 11a, 11b and 11c. Each phase branch 11a, 11b and 11c extends between a positive power bus and positive DC voltage terminal ("+") 12 of power converter 8 and a negative power bus and negative DC voltage terminal ("−") 13.

As further shown in FIG. 1, each converter branch here has a series circuit comprising a number of series-connected converter submodules or modular switches 14. The controllable DC voltage $U_{dc}$ at DC voltage connections 12, 13 of converter 8 can be changed dynamically via the switching states of individual converter submodules 14. The number of converter submodules 14 determines the available number of converter switching states, which enable a fine voltage step-up and a voltage form of high quality and high-voltage levels up to the range of high-voltage direct-current (HVDC) transmission. Converter 8 is thus a modular multilevel converter, which is also referred to as MMC or M2C.

Various configurations of submodules 14 are known in the art, which are suitable for different applications. For example, the so-called half-bridges are primarily used, which are essentially a series circuit of two power semiconductor switches, each with an antiparallel-connected free-wheeling diode, whereby a capacitor is connected in parallel with the series circuit as an energy store. Submodule configurations in the form of full or half-bridge circuits, asymmetric half-bridge circuits or mixed configurations are also known. An invention-compliant configuration of submodule 14 for use in converter 8 is explained in greater detail below in connection with FIG. 2.

In converter branches 9a-9f, circuit-current-limiting inductances 16 can be provided, which support decoupling of the converter branches from one another. The respective alternating voltage terminals 17a, 17b, 17c of current converter 8, which are connected to the alternating voltage source 2, are led out at the connection point between the associated power supply units 9a, 9b or 9c, 9d or 9e, 9f The connections on the DC side of the first uppermost submodules 14 of converter 8 are connected to one another and to positive current bar 12. Similarly, the DC-side terminals of the last, lowermost submodules 14 are connected to one another and to the negative DC voltage terminal 13. Between the current bars 12, 13, the DC voltage $U_{dc}$ of the DC voltage intermediate circuit is applied that can be a high-voltage of e.g. more than 100 kV.

Figure 2:
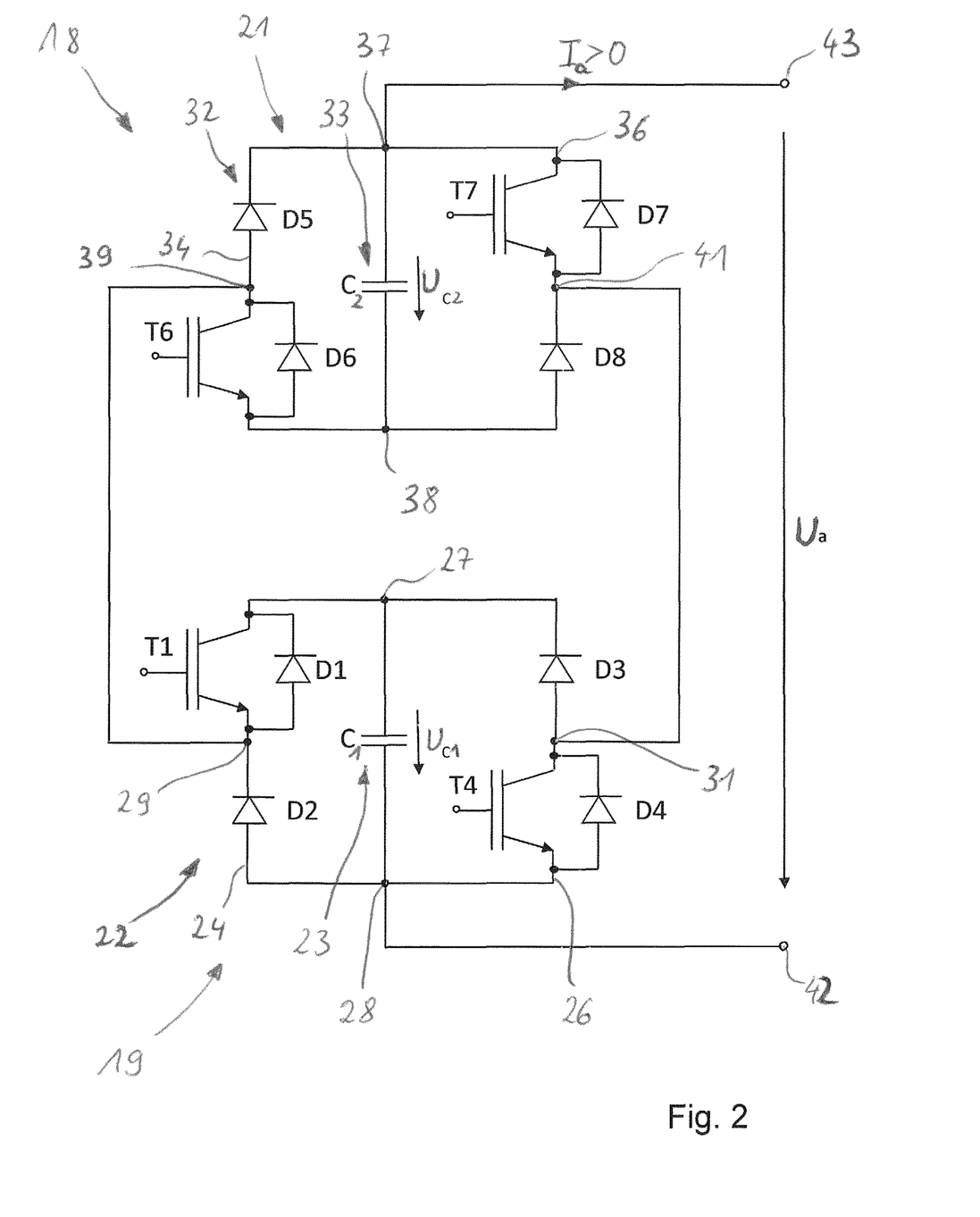
FIG. 2 is a circuit diagram of a dual submodule based on asymmetric half-bridge circuits, that can be used in the modular multilevel converter of FIG. 1 as described in the invention.

FIG. 2 shows, in the form of a simplified circuit diagram, a topology of a dual submodule or modular switch 18 as described in the invention, which can be used in modular multilevel converter 8 as shown in FIG. 1. It should be noted that dual submodule 18 can be used in place of two series-connected half, full, or H-bridges or another two submodules. To this extent, only half of the number of dual submodules 18, according to the invention, can be required for each converter branch 9a-f in comparison to the number of conventional submodules 14.

With reference to FIG. 2, dual submodule 18 substantially has a parallel circuit of two submodules 19, 21. In particular, a first, lower submodule 19 in FIG. 2 has a bridge circuit 22 and a capacitor C1, 23 parallel-connected to bridge circuit 22. Here, bridge circuit 22 is arranged as a so-called asymmetrical half-bridge with two parallel bridge branches 24, 26 connected in parallel to each other between a first and a second direct voltage node or terminal connection 27, 28. The first bridge branch 24 has a series circuit of a first power semiconductor switch T1, which is allocated to an antiparallel or inversely parallel-connected free-wheeling diode D1, and a diode D2. The free-wheeling diode D1 serves to conduct operating current with the opened power semiconductor switch T1 open and to protect the associated power semiconductor switches against inadmissible overvoltages or blocking voltages. Free-wheeling diode D1 and diode D2 connected to it in series are aligned in the flow direction from the second, lower terminal connection 28 in FIG. 2 to the first, upper terminal connection 27 of the first submodule 19. Further, diode D2 with its anode is connected to the second terminal connection 28 and with its cathode is connected to the emitter of power semiconductor switch T1 embodied here as an IGBT (bipolar transistor with isolated gate electrode) and to the anode of the free-wheeling diode D1. The connection point between the unit of the power semiconductor switch T1 and the free-wheeling diode D1 and the diode D2 is designated here as 29.

Similarly, the second bridge branch 26 has a series circuit comprising a diode D3 and a power semiconductor switch T4 to which an antiparallel free-wheeling diode D4 is allocated. In turn, the diode D3 and the free-wheeling diode D4 are oriented in the flow direction from the second terminal connection 28 to the first terminal connection 27 of submodule 19. However, the diode D3 with its cathode is connected to the first terminal connection 27 and with its anode is connected to the collector of the power semiconductor switch T4 embodied here as an IGBT and to the anode of the free-wheeling diode D4. The connection point between the diode D3 and the unit of the power semiconductor switch T4 and the free-wheeling diode D4 is designated here as 31. The diodes D2, D3 are thus arranged diagonally to each other in bridge circuit 22, as are also the power semiconductor element units T1, D1 and T4, D4.

The capacitor C1 as the energy storage of lower submodule 19 is connected between terminal connections 27, 28. In particular, the capacitor C1, 23 is a unipolar capacitor serving as a DC voltage intermediate circuit capacitor of submodule 19.

The power semiconductor switches T1, T4 are controllable switches which, as already mentioned, are here formed from IGBTs. However, in principle, other switchable transistors, e.g. field effect transistors, gate turn-off thyristors (GTOs) or other similar electronic components could be used.

The second, upper submodule 21 in FIG. 2 similarly has a bridge circuit 32 and a capacitor C2, 33 parallel-connected to bridge circuit 32. Here, bridge circuit 32 is also arranged as an asymmetrical half-bridge switch with two parallel bridge branches 34, 36, connected in parallel to each other between a first upper DC voltage node or terminal connection 37 in FIG. 2 and a second, lower direct voltage node or terminal connection 38 of submodule 21. The first bridge branch 34 has a series circuit comprising a diode D5 and a power semiconductor switch T6, which is allocated to an antiparallel or inversely parallel-connected free-wheeling diode D6. The diode D5 and the free-wheeling diode D6 are aligned in the forward direction from the second terminal connection 38 to the first terminal connection 37 of submodule 21. Further, the cathode of diode D5 is connected to the first, upper terminal connection 37, while the anode of diode D5 is connected to the cathode of the free-wheeling diode D6 and to the collector of the IGBT here also designed as a power semiconductor switch T6. The connection point between the diode D5 and the unit of the power semiconductor switch T6 and the associated free-wheeling diode D6 is designated in FIG. 2 as 39.

Similarly, the second bridge branch 36 of the second submodule 21 has a series circuit comprising a power semiconductor switch T7 likewise formed as an IGBT, to which a free-wheeling diode D7 is connected in antiparallel, and a diode D8. The diode D8 and the free-wheeling diode D7 are aligned in the forward direction from the second terminal connection 38 to the first terminal connection 37 of submodule 21. The diode D8 with its anode is connected to the second terminal connection 38 and with its cathode is connected to the emitter of the power semiconductor switch T7 and to the anode of the free-wheeling diode D7. The connection point between the diode D8 and the unit of the power semiconductor switch T7 and the free-wheeling diode D7 is designated here as 41.

The capacitor C2, 33 is parallel-connected to the two bridge branches 34, 36 between terminal connections 37, 38. It is a unipolar capacitor and serves as a direct voltage intermediate circuit capacitor of submodule 21.

As further shown in FIG. 2, the two submodules 19, 21 via their connection points 29, 31 and 39, 41, which normally represent the AC terminals of such asymmetric half-bridges 22, 32, are connected in parallel to each other to form dual submodule 18. More specifically, connection point 29 of the first bridge branch 24 of the first submodule 19 is connected directly electrically to connection point 39 of the first bridge branch 34 of the second submodule 21. Similarly, connection point 31 of the second bridge branch 26 of the first submodule 19 is connected directly electrically to connection point 41 of the second bridge branch 36 of the second submodule 21.

In addition, the second, more negative terminal connection 28 of the first submodule 19 forms a first input/output terminal 42 of the dual submodule 18, while the first, more positive terminal connection 37 of the second submodule 21 forms a second input/output terminal 43 of the dual submodule 18. Via the input/output terminals 42, 43, the dual submodules 18 of the embodiment illustrated in FIG. 2 can be series-connected to form a modular multilevel converter 8 of the type shown in FIG. 1 with any number of levels.

As already mentioned, the two capacitors C1, 23 of the first submodule 19 and C2, 33 of the second submodule 21 are provided as DC voltage intermediate circuit capacitors. The DC voltage $U_{C1}$ and $U_{C2}$ on the capacitors C1, 23 and C2, 33 is always positive due to the circuit of the diodes D2, D3, D5, D8 and the free-wheeling diodes D1, D4, D6, D7 and can amount, e.g. depending on the design and application, to between a few hundred volts and a few kV. The terminal voltage $U_a$ between the second 43 and the first input/output terminal 42 can substantially assume the values 0, $U_{C1}$, $U_{C2}$ or $U_{C1}+U_{C2}$. The voltage $U_{C1}$ and $U_{C2}$ across each capacitor C1, 23 and C2, 33 can be larger or smaller. A current $I_a$ can be flow through the dual submodule 18 in both directions, i.e. from the second input/output terminal 43 to the first input/output terminal 42 or vice versa. By convention here, a current $I_a$, which flows from the first input/output terminal 42 through the dual submodule 18 to the second input/output terminal 43 and outward from there, is called a positive current, whereas the reverse current, which flows from the second input/output terminal 43, through the dual submodule 18, up to the first input/output terminal 42 and from there outward, is called a negative current.

Again with reference to FIG. 1, a control device 44 can be seen, which is provided to suitably control the operation of converter 8 based on the current operating conditions. For clarity, the control paths are only indicated in FIG. 1 by dashed arrows 46, which emerge from control device 44. In particular, control device 44 controls the power semiconductor switches T1, T4, T6 and T7 of dual submodules 18 of all converter branches 9a-f in order to generate, from the mains voltage $U_{ac}$ or its transformed voltage on the alternating-voltage terminals 17a-c, a desired DC voltage $U_{dc}$ between the DC voltage terminals 12, 13 of converter 8 or vice versa. The suitable switching signals for this purpose are determined by the control device depending on the current operating conditions or parameters that are measured and continuously determined by a monitoring device in operation, not illustrated in detail here. In FIG. 1, measurement paths are indicated by dashed arrows 47, which enter the control device 47. It is possible to directly detect or measure e.g. the phase voltages and/or phase currents of the alternating-voltage terminals 17a-c, the branch currents in the converter branches 9a-f and/or the intermediate circuit current in the DC voltage intermediate circuit, the potentials at DC terminals 12, 13 for detecting the DC voltage intermediate circuit voltage $U_{dc}$ and/or other magnitudes. Some magnitudes can be determined from detected variables with generally known relationships for electrical currents and voltages.

Figure 3:
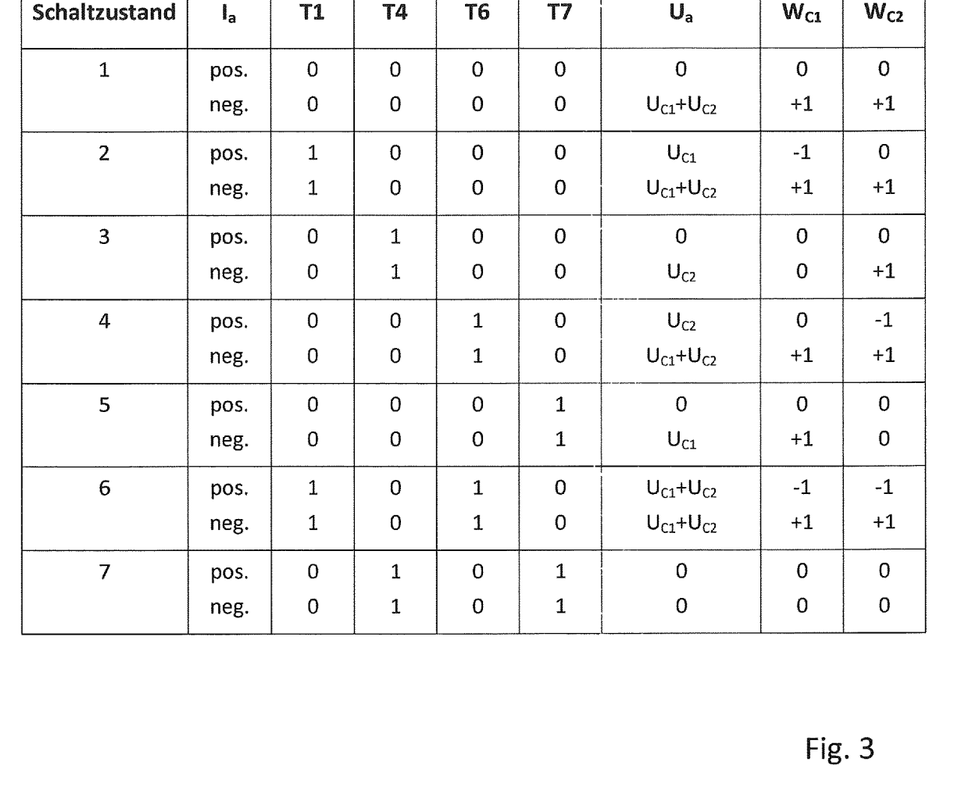
FIG. 3 is a table illustrating the switching states of the dual submodule shown in FIG. 2 with the resulting output voltages.

For further understanding of the operation and effects of modular multilevel converter 8 and dual submodules 8 according to the invention, reference will now be made to FIGS. 3 through 8. FIG. 3 shows a table illustrating different switching states of dual submodule 18, depending on the control of the power semiconductor switches T1, T4, T6 and T7 for both the positive and the negative direction of current I through dual submodule 18. A "0" in a respective switch T1, T4, T6 or T7 means that the power semiconductor switch is switched off or controlled non-conductively, while a "1" indicates that the power semiconductor switch is switched on or controlled conductively.

Also listed is the output voltage $U_a$, which arises between the second and the first input/output terminal 43, 42 of to dual submodule 18 in the respective switching state. As already mentioned, the voltage $U_a$ can assume the values 0, $U_{C1}$, $U_{C2}$ and $U_{C1}+U_{C2}$.

Figure 4:
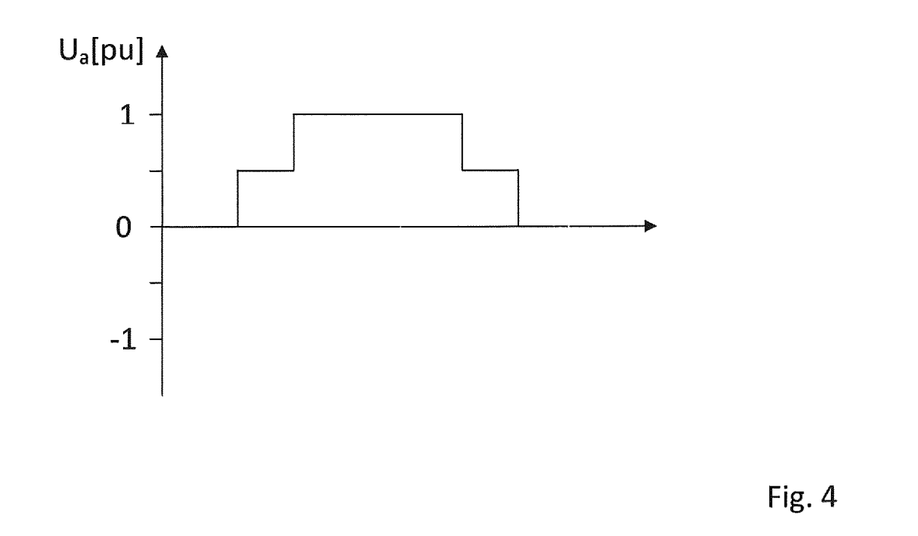
FIG. 4 is shows the output voltage characteristic $U_a$ [pU] standardized, based on the maximum achievable output voltage, for the dual submodule of FIG. 2.

The possible output voltages for dual submodule 18 are shown in FIG. 4 in the form of a simplified characteristic $U_a$ [pU], normalized (per Unit, pU) to the maximum achievable output voltage. The result is a unipolar voltage, similar to that in half-bridge-based submodules, but with three voltage levels. Further, a bipolar current, i.e. a current that flows in any direction, can be passed through dual submodule 18.

Also listed in the table according to FIG. 3 are two columns with the captions WC1 and WC2, which illustrate the energy flow into and out of each capacitor C1, 23 and C2, 33. A "+1" indicates that the respective capacitor absorbs energy by being charged. A "1" indicates that the respective capacitor is being discharged and releases energy. A "0" indicates that the capacitor substantially retains its energy, whereby the current flow is guided past it. As can be seen, a so-called "balancing" of the energy content of the capacitors C1, C2 of the dual submodule can be achieved by using appropriate switching states to adjust and equalize the voltages of the capacitors C1, C2 to a corresponding reference or mean value. There are sufficient switching states with which, at a desired terminal voltage $U_a$ of the dual submodule 18, such a "balancing" of the capacitor voltage or their energy content can be achieved.

Incidentally, dual submodule 18 also provides redundant switching states, with which the respective desired terminal voltage $U_a$ can be obtained. For example, as can also be seen in FIG. 3, a zero voltage is achieved with a positive current when all of the power semiconductor switches T1, T4, T6, T7 are switched off, whereby the switch T4 and/or the switch T7 can also be switched on. For the dual or maximum capacitor voltage $U_{C1}+U_{C2}$, either all power semiconductor switches T1, T4, T6, T7 can be switched with a negative current, or the switch T1 and/or the switch T6 can also be switched on. It is also determined similarly for a terminal voltage $U_a$ corresponding to the single capacitor voltage.

Figure 5:
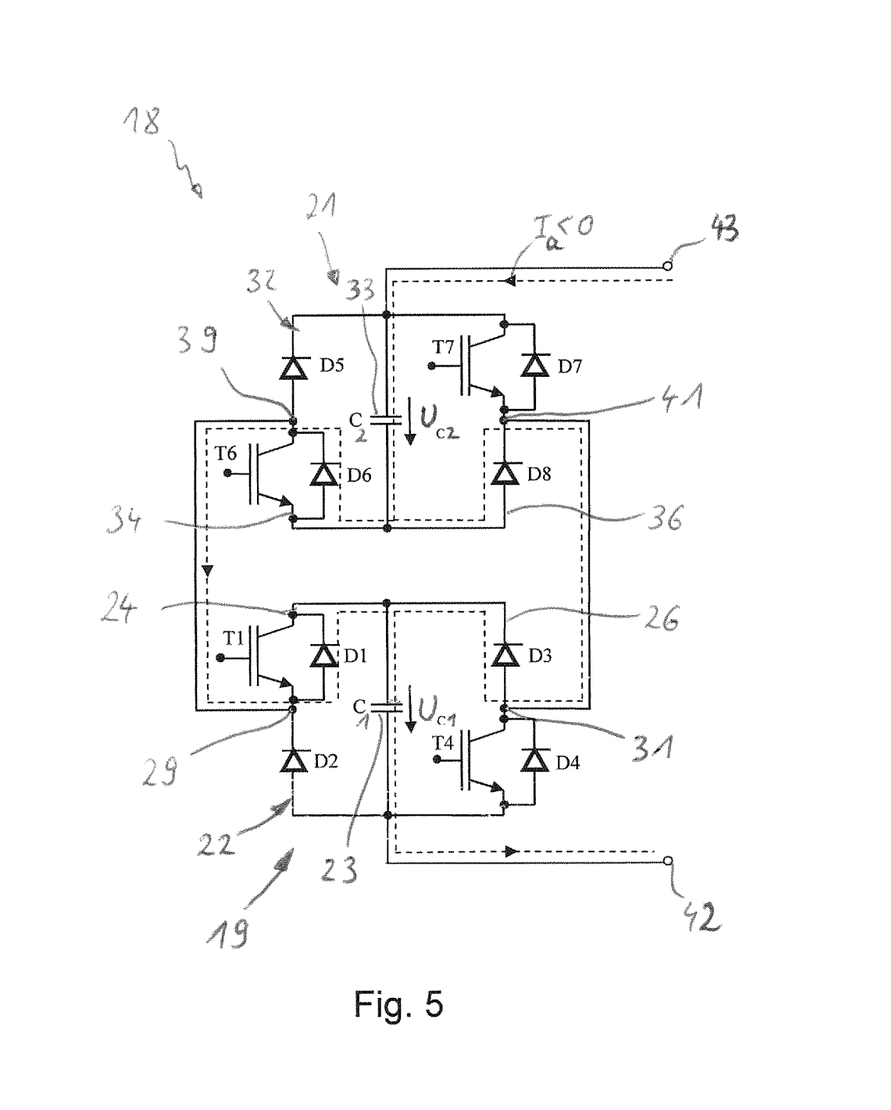
FIG. 5 is a circuit diagram of the dual submodule as shown in FIG. 2, illustrating a current flow in a first direction during specific switching states of the dual submodule.
Figure 6:
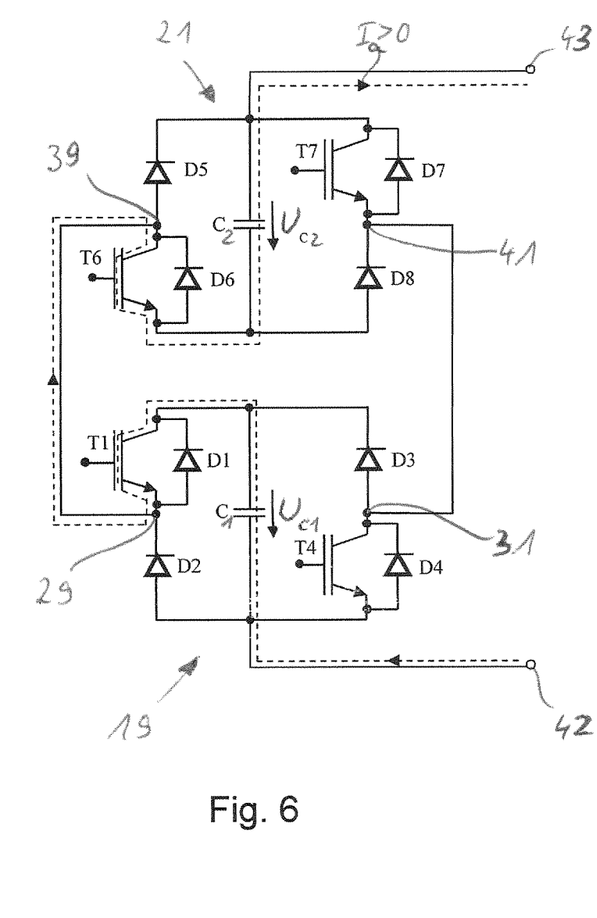
FIG. 6 is a circuit diagram of the dual submodule as shown in FIG. 2, illustrating switching states with a current direction opposite to that of FIG. 5.

FIGS. 5 and 6 show the circuit configuration of dual submodule 18 as shown in FIG. 2, illustrating the current flows through dual submodule 18, when the maximum terminal voltage $U_a$ equal to $U_{C1}+U_{C2}$ is applied between terminals 43, 42. In FIG. 5, the current $I_a$ is negative, so that the current from the second terminal 43 flows into the dual submodule. The power semiconductor switches T7, T4 are switched off, while the power semiconductor switches T6 and T1 can either be switched on or switched off. The current flows from the second input/output terminal 43 through the capacitor C2, 33 and then splits in two current paths, one of which is via the free-wheeling diode D6, connection points 39, 29, the free-wheeling diode D1 up to the capacitor C1, 23, and the other extends through the diode D8, to connection points 41, 31, the diode D3 up to the capacitor C1, 23. The current then flows through the capacitor C1 and over the first input/output terminal 42. The current splits into two current paths in such a way that the current load of the diodes decreases and it can have smaller dimensions if necessary, or its conduction losses according to the current-voltage characteristic in the passband can be smaller and have a lower cooling requirement. The conduction losses are thereby reduced still further, even lower than with submodules based on a half-bridge, in which in corresponding switching states only one current path with a single semiconductor, i.e. a single free-wheeling diode, conducts the entire current, as shown in more detail below in connection with FIG. 8.

FIG. 6 shows the case in which the power semiconductor switches T1 and T6 are switched on, while the power semiconductor switches T4, T7 can either be switched on or off, in the case of a current flow in the positive direction, and at the maximum terminal voltage $U_a$ between the terminals 42, 43. The current $I_a$ flows from the first output terminal 42 through the capacitor C1, 23, through the switched-on power semiconductor switch T1, through the connection between connection points 29, 39, through the power semiconductor switch T6, through the capacitor C2, 33 and from the second input/output terminal 43 out of dual submodule 18. Only one power semiconductor switch T1 or T6 in each of submodules 19, 21 is conductive, which corresponds to submodules based on a half-bridge. The line losses are similar to or even lower than in half-bridge-based submodules, and in any case considerably lower than in full bridge-based submodules, in which, for each submodule, two power semiconductor switches are switched on conductively in operation.

Figure 7:
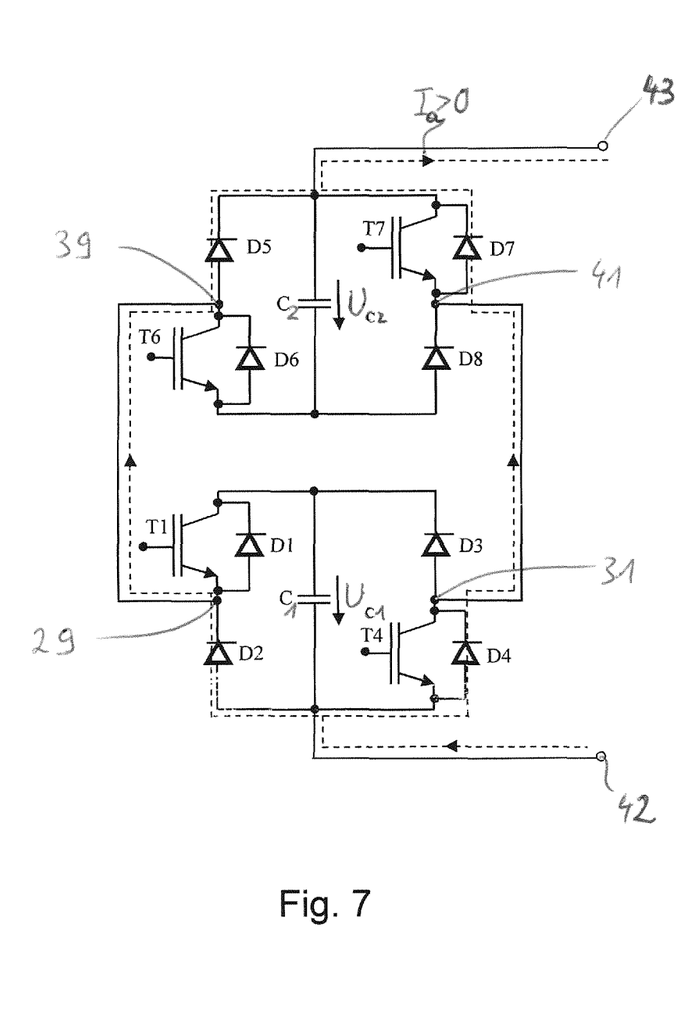
FIG. 7 is a circuit diagram of the dual submodule as shown in FIG. 2, illustrating another switching state of the dual submodule and the resulting current paths.

FIG. 7 shows a so-called bypass operating mode with a positive current that flows from the first input/output terminal 42 of dual submodule 18 through dual submodule 18 while bypassing all of the power semiconductor switches T1, T4, T6 and T7 to the second input/output terminal 43 and from there outward. This operating mode occurs when the power semiconductor switches T1 and T6 are switched off. The power semiconductor switches T7 and T4 can either be switched on or off. As illustrated, the current splits again into two parallel current paths, one of which flows from the first terminal 42 through diode D2, via connection 29, 39, through diode D5 to the second terminal 43, while the second current path flows through the free-wheeling diode D4, via connection 31, 41 and through the free-wheeling diode D7 to the second terminal 43. The terminal voltage $U_a$ is substantially zero after neglecting the forward voltages of the semiconductor components.

Figure 8:
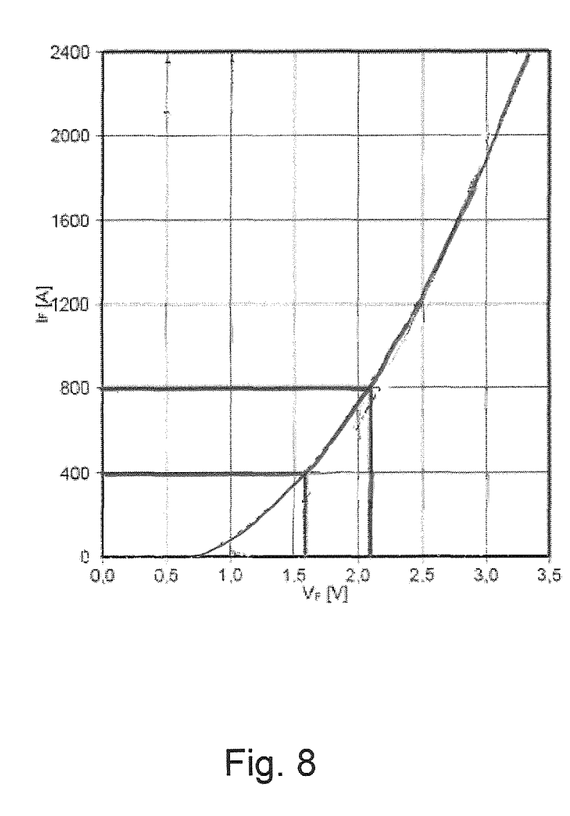
FIG. 8 is an exemplary current-voltage characteristic in the passband of a diode for use in the circuit arrangement of the dual submodule as shown in FIG. 2, illustrating a reduction of line losses by providing parallel current paths.

The parallel current paths in the switching states as shown in FIGS. 5 and 7 result in a further reduction of line losses in operation. With reference to FIG. 8, which shows a current-voltage characteristic of an exemplary diode for use in the dual submodule, it is seen that, in the conductive state of a diode with a current of, for example, 800 A and an associated forward voltage of 2.1 V, a power loss of 1×800 A×2.1 V=1,680 W results. With a splitting of the currents into two parallel current paths and two semiconductor components, as is the case e.g. in the switching states according to FIGS. 5 and 7, only half the current of 400 A flows through each diode, while the forward voltage is approximately 1.6 V. For two diodes, this results in a power loss of 2×400 A×1.6 V=1,280 W. Consequently, the power loss can be reduced by up to approx. 400 W, or 25%. In this respect, according to the invention, dual submodule 18 allows a significant reduction of line losses in comparison to half-bridge-based submodules.

According to the invention, the dual submodule 18 is an increased short-circuit current strength in the case of a short-circuit in the DC intermediate circuit. When control device 44 detects a short-circuit in the DC intermediate circuit or on the DC side of converter 8, it controls all of the power semiconductor switches T1, T4, T6 and T7 of all submodules to switch them off. A short-circuit current powered by the AC power supply then flows through respective converter branches 9a-f through dual submodules 18. With switched-off power semiconductor switches of dual submodules 18, the current path illustrated in FIG. 7 results on one side of the DC voltage terminals (depending on the energy flow direction), in which the current is split into two parallel current paths. Thus, two power semiconductor components D2, D4 and D5, D7 are loaded in each submodule 19, 21 with only half the short-circuit current. The diodes can be designed for smaller short-circuit currents. Additional, sometimes parallel protective components can be omitted. In particular, the requirements can be reduced with respect to the limit load integral (i2t) of the diodes and free-wheeling diodes used, in comparison to half-bridge-based submodules. In the half short-circuit current, the corresponding limit load integral for the diodes can clearly be reduced, in theory by up to one quarter.

Thus, dual submodule 18 is created which has a simple and cost-effective structure, which also allows the basis for the use of existing mechanical configurations for the basic structure, e.g. submodules based on a full bridge, thereby permitting the current and voltage characteristics of a half-bridge-based submodule to be obtained. Accordingly, a simple and cost-effective implementation of a modular multilevel converter for various applications is also made possible. The line losses can be reduced both compared to half-bridge-based and full bridge-based submodules. The number of power semiconductor switches used correspond to that of half-bridge-based submodules and is only half that of full bridge-based submodules. Through the use of additional diodes in asymmetric bridge circuits 22, 32 of dual submodule 18, the conduction losses in different switching states can be further reduced and the short-circuit strength can be improved. The dual submodules 18, according to the invention, can be retrofitted with little effort in existing hardware environments of modular multilevel converters that use submodules based on full bridges. Dual submodule 18 is created for modular multilevel converter 8, whereby dual submodule 18 has two interconnected submodules 19, 21, whereby each submodule has asymmetrical half-bridge circuit 22, 32 with two parallel bridge branches 24, 26; 34, 36, which are connected between a first and a second terminal connection 27, 28; 37, 38 of submodule 19, 21, whereby each bridge branch is formed from a series circuit of a power semiconductor switch T1, T4; T6, T7, and a diode D2, D3; D5, D8, whereby the power semiconductor switch is allocated to an antiparallel free-wheeling diode D1, D4; D6, D7, and has a capacitor 23; 33, which is connected in parallel with asymmetrical half-bridge circuit 22; 32 between the first and the second terminal connections of the module.

Submodules 19, 21 are connected to each other via their AC terminals 29, 31; 39, 41 to form dual submodule 18. Further, a modular multilevel converter 8 is created, comprising a number of such dual submodules 18 in each of its converter branches 9a-9f.

What we claim is:

1. A dual submodule for a modular multilevel converter being electrically coupled to a power supply network, comprising:
    a first submodule interconnected to a second submodule, each submodule comprising:
        an asymmetrical half-bridge circuit having a first bridge branch and a second bridge branch, each bridge branch (i) being arranged in parallel to the other of the first and second bridge branch between a first and a second terminal connection of the submodule; (ii) being formed from a first diode and a single series circuit of a power semiconductor switch having an antiparallel free-wheeling diode allocated to it; and (iii) comprising an AC terminal located between the first diode and the single series circuit; and
        a capacitor connected in parallel to the asymmetrical half-bridge circuit between the first and the second terminal connections of each submodule;
    wherein, the AC terminal of the first bridge branch of the first submodule forms a first connection point with the AC terminal of the first bridge branch of the second submodule, and the AC terminal of the second bridge branch of the first submodule forms a second connection point with the AC terminal of the second bridge branch of the second submodule, the direct connections between the AC terminals being in parallel to each other and forming the dual submodule;
    and wherein in the event of a short-circuit within the converter, the power semiconductor switches of the second bridge branches are switched off, and a current being powered by the power supply network (i) flows from an output terminal to the capacitor of the first submodule and (ii) splits into two separate paths, one path being via the free-wheeling diode of the first bridge branch of the first submodule to the first connection point, and continuing to the capacitor of the second submodule via the free-wheeling diode of the first bridge branch of the second submodule, and the second path being via the first diode of the second bridge branch of the first submodule to the second connection point, and continuing to the capacitor of the second submodule via the first diode of the second bridge branch of the second submodule.

2. The dual submodule as described claim 1, wherein a first, more negative terminal connection of the first submodule forms a first input/output terminal of the dual submodule, while a second, more positive terminal connection of the second submodule forms a second input/output terminal of the dual submodule.

3. The dual submodule as described in claim 2, wherein the dual submodule is arranged in such a way, when controlling the power semiconductor switch, a unipolar output voltage is always generated, and a bipolar current is conducted between the first and the second input/output terminal of the dual submodule.

4. The dual submodule as described in claim 2, wherein the dual submodule is arranged in such a way, when controlling the power semiconductor switch, a zero terminal voltage, a terminal voltage that corresponds to the positive voltage of one of the capacitors, or a voltage is generated that corresponds to the sum of the positive voltages of the capacitors.

5. The dual submodule as described in claim 2, wherein the dual submodule is arranged in such a way, when the current is conducted between the first and the second input/output terminal of the dual submodule in each direction in each submodule, a maximum of only one power semiconductor switch is current-conductive.

6. The dual submodule as described in claim 1, wherein all of the diodes and free-wheeling diodes are aligned in the forward direction from the second to the first terminal connections of each submodule.

7. The dual submodule as described in claim 1, wherein the diodes in the bridge branches of each submodule are connected directly to different terminals of the submodule.

8. The dual submodule as described in claim 1, wherein the submodules are connected to each other electrically in such a way that an anode of one diode in a bridge branch of one of the submodules is always connected directly to a cathode of a diode in a bridge branch of the other submodule.

9. The dual submodule as described in claim 1, wherein the power semiconductor switches of the first bridge branches are switched on.

10. The dual submodule as described in claim 1, wherein the power semiconductor switch of the first bridge branches are switched off.

11. A modular multilevel converter for converting an AC voltage into a DC voltage, or vice versa, the modular multilevel converter having at least one phase branch with an AC voltage connection and at least one DC voltage connection connected to the DC voltage intermediate circuit;

wherein, a converter branch is formed between each DC voltage connection and each AC voltage connection; and wherein, in each of the converter branches, at least one dual submodule is arranged as described in claim 1.

12. The modular multilevel converter described in claim 11 which has a number of phase branches corresponding to the number of phases, a first DC voltage terminal connected to the first terminal of the DC voltage intermediate circuit, a second DC voltage terminal connected to the second terminal of the DC voltage intermediate circuit, and in all converter branches the same number of dual submodules.

13. The modular multilevel converter as described in claim 11, further comprising a control device for controlling the operation of the modular multilevel converter, wherein the control device is arranged to control the power semiconductor switch in such a way that a unipolar output voltage is always emitted and a bipolar current can be transmitted between the input/output terminals of the dual submodule.

14. The modular multilevel converter as described in claim 11, wherein the control device is arranged to detect a short-circuit in the DC voltage intermediate circuit and then switch off all of the power semiconductor switches of a dual submodule, in order to conduct a short-circuit current via parallel current paths in the dual submodule, wherein each current path has two series-connected diodes or free-wheeling diodes of the dual submodule.

* * * * *